(12) United States Patent
Serre

(10) Patent No.: US 6,382,867 B2
(45) Date of Patent: *May 7, 2002

(54) JOINING DEVICE FOR FIRMLY JOINING PLASTIC JOINING PARTS TOGETHER

(75) Inventor: Pascal Serre, Düsseldorf (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,928

(22) Filed: Nov. 24, 1998

(30) Foreign Application Priority Data

Nov. 28, 1997 (FR) .............................. 97 15028

(51) Int. Cl.[7] ................................. F16B 2/24
(52) U.S. Cl. ........................ 403/329; 403/24; 24/662
(58) Field of Search ................... 403/326, 329, 403/328, 24; 379/428, 440, 433; 24/662, 614, 587, 616

(56) References Cited

U.S. PATENT DOCUMENTS

| 437,004 A | * | 9/1890 | Shipley | 24/662 |
|---|---|---|---|---|
| 1,200,223 A | * | 10/1916 | Nathan | 24/662 |
| 1,823,229 A | * | 9/1931 | Balbaud | 24/662 |
| 2,832,943 A | * | 4/1958 | Cutler | 403/326 X |
| 2,946,612 A | * | 7/1960 | Ahlgren | 24/662 X |
| 4,616,953 A | * | 10/1986 | Gomes | 24/662 X |
| 4,726,705 A | | 2/1988 | Gomes | 403/407 |
| 5,309,950 A | * | 5/1994 | Bassi et al. | 403/329 X |
| 5,536,917 A | | 7/1996 | Suppelsa et al. | 219/201 |
| 5,678,953 A | * | 10/1997 | Usui et al. | 403/329 |
| 5,807,012 A | * | 9/1998 | Emmert et al. | 403/326 X |
| 5,899,824 A | * | 5/1999 | Kurtz et al. | 403/326 X |
| 6,088,447 A | * | 7/2000 | Aggus et al. | 379/428 |

FOREIGN PATENT DOCUMENTS

| DE | 9109552 | | 10/1991 | ............ H04M/1/03 |
| EP | 0337227 A2 | | 10/1989 | ............ F25B/9/00 |
| FR | 360591 | * | 4/1906 | ................ 24/662 |
| FR | 2656165 A | | 6/1991 | ......... H01R/13/633 |

* cited by examiner

Primary Examiner—Harry C. Kim
(74) Attorney, Agent, or Firm—Dicran Halajian

(57) ABSTRACT

A joining device has a female part and a male part for joining with the female part. The female part has a retaining opening, and the male part has an inserting part for insertion in the retaining opening of the female part. The female part further has female shoulders that form an input of the retaining opening, and the inserting part has male shoulders. The male shoulders are inclined with respect to the female shoulders so that the contact between the male shoulders and female shoulders is reduced to a point when the inserting part is inserted in the retaining opening.

12 Claims, 3 Drawing Sheets

JOINING DEVICE FOR FIRMLY JOINING PLASTIC JOINING PARTS TOGETHER

FIELD OF THE INVENTION

The present invention relates to a joining device for rigidly locking two complementary joining parts together of which at least a first part is made of molded plastic, comprising a female part joined to said first joining part by molding it at the same time as said first joining part and a male part joined to the second joining part.

For several decades the housings of electronic devices, at least as regards small and medium-sized devices, have more often than not been formed by two plastic joining parts joined together. At the beginning the assembling was carried out, in essence, with screws, in continuation of what is commonly done for metallic housings. Gradually, progress has been made in the molding of joining parts of plastic and it has become possible to put at least partly the joining parts together by clipping complementary parts that fit together in both joining parts, these parts being obtained by molding them at the same time as their joining part and their coupling being realized by under-pressure, by means of a previous deformation that is permitted because of the elasticity of the plastic material.

A medium-sized device is notably understood to mean television receivers, various elements of an audio or video set or of a personal computer, a telephone base station, and a small device is understood to mean a pocket calculator, an infrared remote control and, more recently, a cellular or cordless telephone handset.

BACKGROUND OF THE INVENTION

Screwing the joining parts onto each other provides the advantage of a proper assembly strength and is a guarantee that joining parts will not come loose during a shock notably due to a fall, this being certainly true for small electronic devices which are autonomous because they have a battery and are handheld.

Alternatively, joining two joining parts firmly together with screws has several drawbacks too: it implies the supply of separate elements, that is to say, screws, and a rather long assembly time which is directly proportional to the number of screws provided, more often than not more than 4, so that the result is rather high assembly costs and also a drawback that is less apparent than the two preceding ones but perhaps paramount, which is the fact that it is all too easy to separate the two parts, notably by a private person, which may invalidate the effect of guarantee of the device in case it breaks down.

The balance of reciprocal advantages and disadvantages of the screwing and clipping generally results in a compromise which consists of clipping the main part and retaining at least one screw to achieve this joining together.

Nowadays, however, one wishes to join the joining parts together entirely by clipping including small devices which, more than minimum-sized devices, are liable to drops.

With the conventional type of clipping as described, for example, in U.S. Pat. No. 5,536,917 particularly with reference to FIG. 1 of this patent specification, each joining device intended to replace a screw is formed by a male part on one joining part and a female part on the other joining part, with a sufficiently narrow protrusion on each joining part and the catch that is realized is simple in the sense that it needs a single face of each coupling during assembly. Under these conditions and if the device drops, the joining parts are twisted in diverging directions to the point where in their relative movements they take along the joining parts which they comprise and which they come uncouple. The joining parts may also be broken as a consequence of the shock. Furthermore, the molding operations of the joining parts have become ever more precise, permitting small thicknesses (of the order of 2 mm) which intensifies their deformation in case of shocks. To remedy this, while maintaining the type of clipping of the afore-mentioned type, the joining devices may be reinforced by increasing their dimensions, particularly their thickness and also their number. This reduces the risk of breakage and coming loose during a fall, but this does not resolve the technical problem as regards the screwing that may be entirely omitted and thus also brings about a new problem for persons who have to realize the assembly manually: the reinforcement of the joining devices requires a pressure which is accordingly higher, which pressure becomes inadmissible beyond a certain threshold.

It is an object of the invention to realize a rapid assembly of two plastic joining parts which form the housing of an electronic device by totally or partly doing away with the assembly with screws.

It is another object of the invention to realize the assembly of two plastic joining parts by means of joining devices realized by molding at the same time as the joining parts and in such a way that these joining parts will not come loose in case they drop.

A still further object of the invention is to realize the assembly of two fully plastic joining parts by means of joining devices realized by molding at the same time as the joining parts and in such a way that the forces required for the assembly remain in a range of quite low values.

SUMMARY OF THE INVENTION

These objects are achieved and the drawbacks of the prior art are mitigated thanks to the fact that a joining device described in the opening paragraph is characterized in that said female part is formed by at least two hooks positioned symmetrically opposite one another so as to determine between them in longitudinal direction two spaces into which the male part is to be pushed, a first inserting space of a flared shape, said flare having its large diameter at the free end and a second space of rectangular longitudinal section called retaining space, the interface between said first and second space forming at least two female shoulders for said hooks, and in that the complementary male part situated opposite has an inserting end which has a slightly smaller diameter than the large diameter of said flare and then becomes larger until a common shoulder of the male part is reached.

The symmetry thus brought to each of the two parts of each joining device and their independent concept of the walls of the joining parts prevents this joining device from coming loose. In effect, if during a shock the two parts have a tendency to come loose on one side of the joining device, the retaining effect is reinforced accordingly on the opposite side and after the shock the two sides remain firmly attached together. It will be noted that the increased reliability for attaching the joining parts together is important for small devices which are intended to be held in hand and are thus more exposed to drops than medium-sized devices. Moreover, the small devices such as a mobile telephone handset are designed for resisting shocks and are to continue operation even after various drops. All the more reasons for the housing of the device not be dislocated after the fall, even a quite violent fall.

A preferred embodiment of the invention is characterized in that said female part is formed by a clip having two symmetrical hooks relative to a plane of symmetry and in that said male part which stretches out in said plane of symmetry perpendicularly to the longitudinal direction of said hooks, has a section whose shape is constituted by an arc of circle as regards its inserting part and by two slightly retractable planes which form said common shoulder of the male part relative to its opposite part which is complementary to its inserting part.

This embodiment is quite interesting for small devices because it lends itself well to a miniaturization. For that matter, small devices, mostly mobiles, include a battery and it is convenient to put such joining devices into a part whose volume is occupied by the battery, which permits the access to these housings in case they are to be taken apart.

A further preferred embodiment of the invention is characterized in that said female part is formed by a substantially cylindrical sleeve and comprises at least three hooks separated by longitudinal grooves, said first space forming a truncate cone and said second space a cylinder and in that the male part is formed by a dog joint with a cone-shaped end.

This further preferred embodiment of the invention is highly suitable for medium-sized devices where the miniaturization is not the first concern. Furthermore, it permits of unlocking joining devices from the outside of the device and this by means of a tool designed for this purpose which does not form part of the present invention.

It will be noted that for the two embodiments described before, the male part of the joining device is solid and may deform only slightly. This makes it possible to join two joining parts together of which one, made of plastic, preferably of ABS, comprises the female parts of the joining devices and the other may be metallic and comprise complementary male parts made of metal.

BRIEF DESCRIPTION OF THE DRAWINGS

These and other aspects of the invention are apparent from and will be elucidated with reference to the embodiments described hereinafter.

In the drawings.

DESCRIPTION OF PREFERRED EMBODIMENTS

Figure 2:
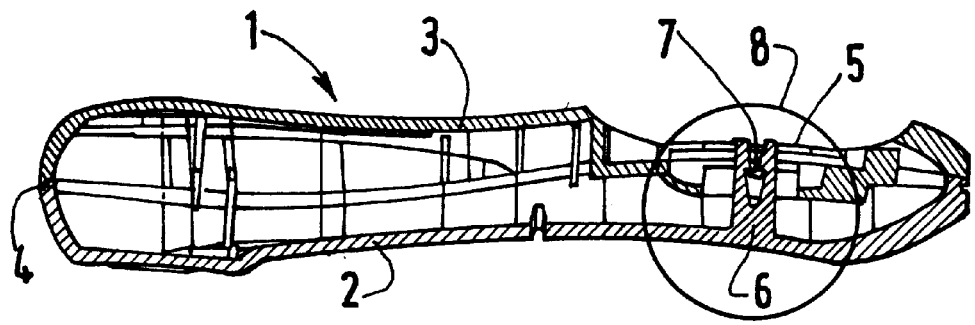
FIG. 2 is the view along the section II—II of FIG. 1.
Figure 1:
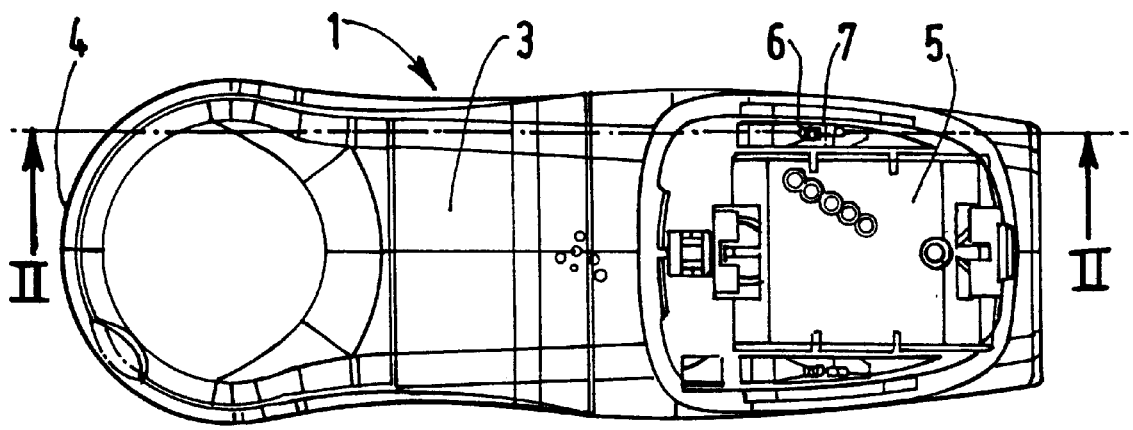
FIG. 1 represents in plan view and without its battery the housing of a cordless telephone handset which incorporates a first embodiment of the invention.

FIGS. 1 and 2 represent the housing 1 of a cordless telephone handset, this housing being formed by two joining parts joined together, a joining part called front part 2 and a joining part called back part 3, only visible in FIG. 1. Inside the upper part 4 of the handset are provided for locking the two joining parts 2 and 3 together in known manner (not shown), rigid locking elements (not shown) which work together by means of a notch from a mutual position of the joining parts that corresponds to a slight opening at the bottom of the housing. To achieve the locking of the joining parts from this half-open position, joining devices according to the invention are provided which are visible at the lower part of the housing 1 at the place of the battery cover of the telephone handset which corresponds to a recess 5 made in the back part 3 in FIGS. 1 and 2.

These two devices are located sideways and comprise each a female part 6 firmly attached to the front part 2 and a male part 7 firmly attached to the back part 3. It will be noted that the parts 6 and 7 are obtained by molding at the same time as their respective joining part, the molding product used being preferably acrylonitrile butadiene styrene (ABS). It will also be noted that the male and female parts 6 and 7 are not directly firmly attached to the side walls of their joining parts, but firmly attached to the bottom of the joining part at least as regards the female part 6.

Figure 3:
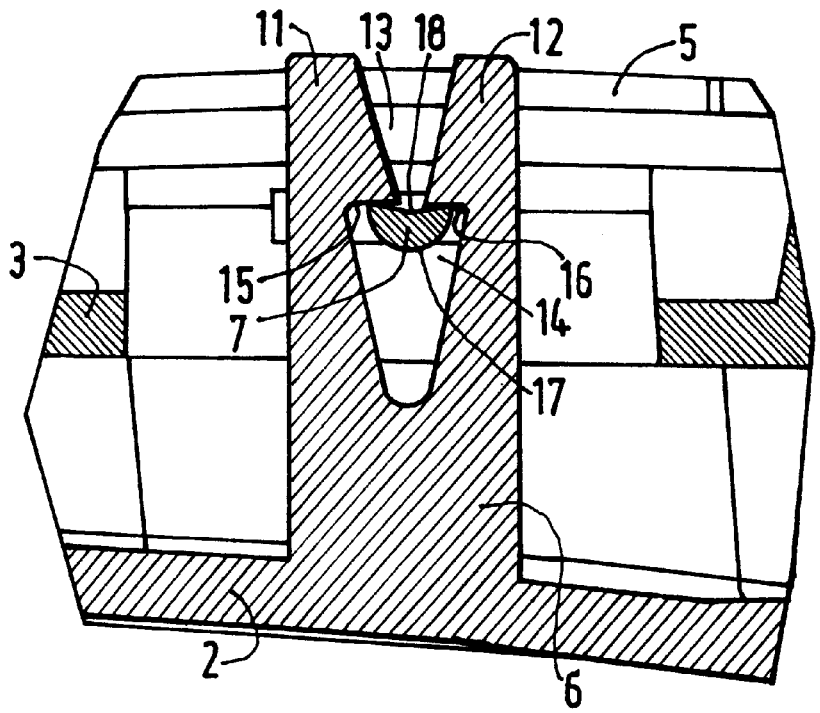
FIG. 3 is the enlarged view of a part of FIG. 2 which incorporates the invention.
Figure 4:
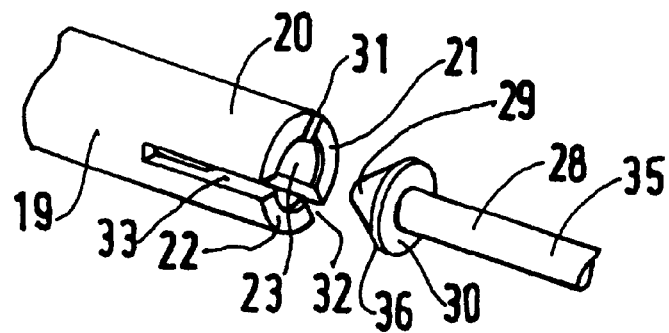
FIG. 4 represents in a perspective view a joining device according to a second embodiment of the invention, before the joining.

The joining device is better visible in FIG. 3 which is the part 8 of FIG. 2 enlarged six times. The female part has two elastic hooks 11 and 12 located symmetrically opposite one another, these hooks determining between them spaces intended to be successively pushed open by the male part 7 which is in this case a rod connected by its two ends to the joining part 3. The two spaces consist of a first inserting space 13 having a flared shape which flared shape is a V-shape open at its two ends and a second space called retaining space 14 in which the inserting space ends. At the interface between the spaces 13 and 14 there are two hooks present defined by their female shoulders 15 and 16. The male part 7 has an inserting end 17 which becomes larger from the bottom upwards in FIG. 3 while the size of part 7 is adapted to that of the flared opening 13 so that it is embedded a first time when it is inserted for locking the joining parts together. At its upper part the male part 7 is ended by a common shoulder 18 of the male part.

More precisely, the embodiment of the invention of FIGS. 1 to 3 consists of a clip of two symmetrical hooks 11 and 12. The male part 7 in the shape of a rod is extended substantially in the plane of symmetry of the hooks 11 and 12, perpendicularly to their longitudinal direction and its section is formed downwards by an arc of circle and upwards by a chord connected to the ends of this arc of circle and which corresponds to the common shoulder 18. Preferably, the common shoulder 18 is formed by two slightly retracted flattenings which have an inclination in the same direction as that of the space 13 which, when locked because the rod 7 passes from space 13 to space 14, causes a better anti-return effect or also a harpoon effect of this part 7 against the shoulders 15 and 16, because the contact of each flattening with a shoulder 15 or 16 respectively, is reduced to a point on the section of FIG. 3, instead of a line segment, which provides a better fastening between the parts 6 and 7 notably in the case of shock.

For the various embodiments of the invention a dismantling of the joining parts is provided. For the embodiment of FIGS. 1 to 3 is indicated above that the joining devices were accessible after the batteries of the telephony device (of the handset) had been taken away. For detaching the parts 6 and 7 it is sufficient to take away the free ends of the hooks 11 and 12 either by hand or by means of a tool preferably designed for this purpose. To facilitate this detaching as required, it is possible to lengthen the free ends of the hooks 11 and 12 in the shape of horns.

The force necessary for realizing the locking of the joining devices is to remain within reasonable limits. This force is proportional to the number of these joining devices and also to the rigidity of the hooks 11 and 12 of the female part 6. This rigidity may be varied by varying the useful length of the hooks and/or by varying their thickness in a direction perpendicular to the plane of the FIGS. 2 and 3.

Figure 6:
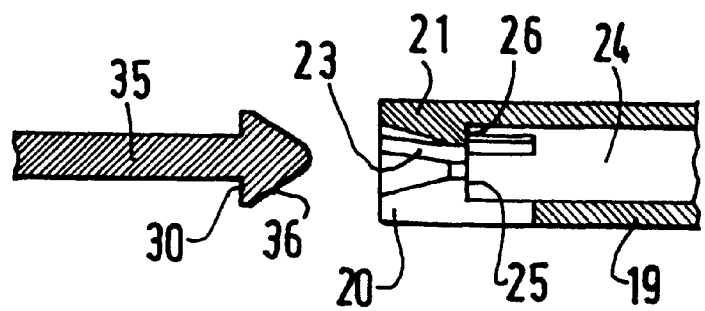
FIG. 6 is the section VI–VI of FIG. 5A.

A second embodiment of the joining device according to the invention preferably reserved to electronic devices that are larger than telephone handsets, that is to say, of medium size, is represented in FIGS. 4 to 7. The same essential characteristic features of the invention will be found back, which are:

for the female part 19, various hooks 20, 21 and 22, a first inserting space 23 of a flared shape, a second retaining space 24 of rectangular section, and three female shoulders 25, 26, 27 of which the 25 and 26 are visible in FIG. 6, for the male part 28, an inserting end 29 proportional to the inserting space 23 which becomes wider until it reaches a common shoulder of the male part 30.

More precisely, the embodiment of the FIGS. 4 to 7 consists of a cylindrical sleeve 19 with three hooks 20, 21, 22 separated by as many longitudinal grooves 31, 32, 33. The first inserting space 23 has the shape of a truncate cone and the second retaining space 24 that of a cylinder. The male part 28 is formed by a dog joint 35 having a conical end 36.

Figures 5A, 5B, 5C:
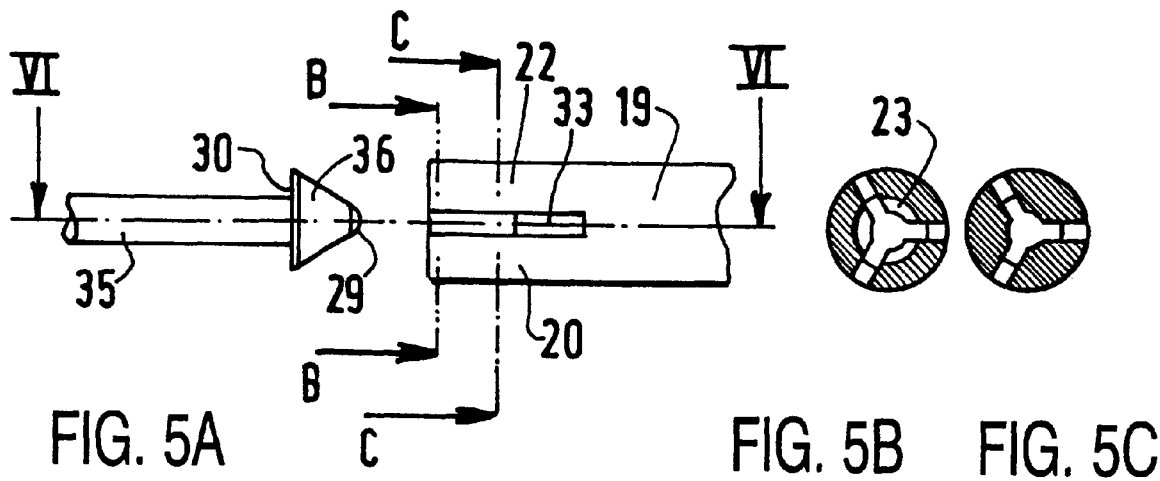
FIG. 5 represents in A a plan view of the device of FIG. 4 and in B and C the sections B—B and C—C of FIG. 5A.

The plan view of FIG. 5A and the cross-sectional views of FIGS. 5B, 5C and 6 show certain details of the second embodiment of the invention. Notably (see FIG. 5) the conical end 36 and the first inserting space 23 have small bases which are substantially of the same diameter, whereas the large base of the end 36 is larger than the general base of the space 23, while the two truncate cones 23 and 36 furthermore have substantially the same height. On the other hand, according to a first variant, it is visible in FIG. 6 that the large diameter of the end 36 is substantially equal to the diameter of the second retaining space 24. Thus, after the parts 19 and 28 are firmly attached to each other (not shown), the shoulder 30 pushes against the shoulders 25, 26 and 27 without any lateral play and the hooks 20, 21, and 22 are not radially pushed outward when there is no shock. As for the first embodiment shown in FIGS. 1 to 3, it may be advantageous to realize a slightly retracted shoulder 30 to improve the locking of this male shoulder against the female shoulders 25, 26 and 27. It will also be noted that the rigidity of the hooks 20, 21 and 22 is favored by their curved shape which gives a rib effect. Like for the first embodiment, this rigidity may be modified by varying the length of the hooks and/or the diameter of the sleeve 19 having a constant thickness in radial direction, while the rigidity is all the less pronounced as this length is large and/or this diameter is small.

Figure 7:
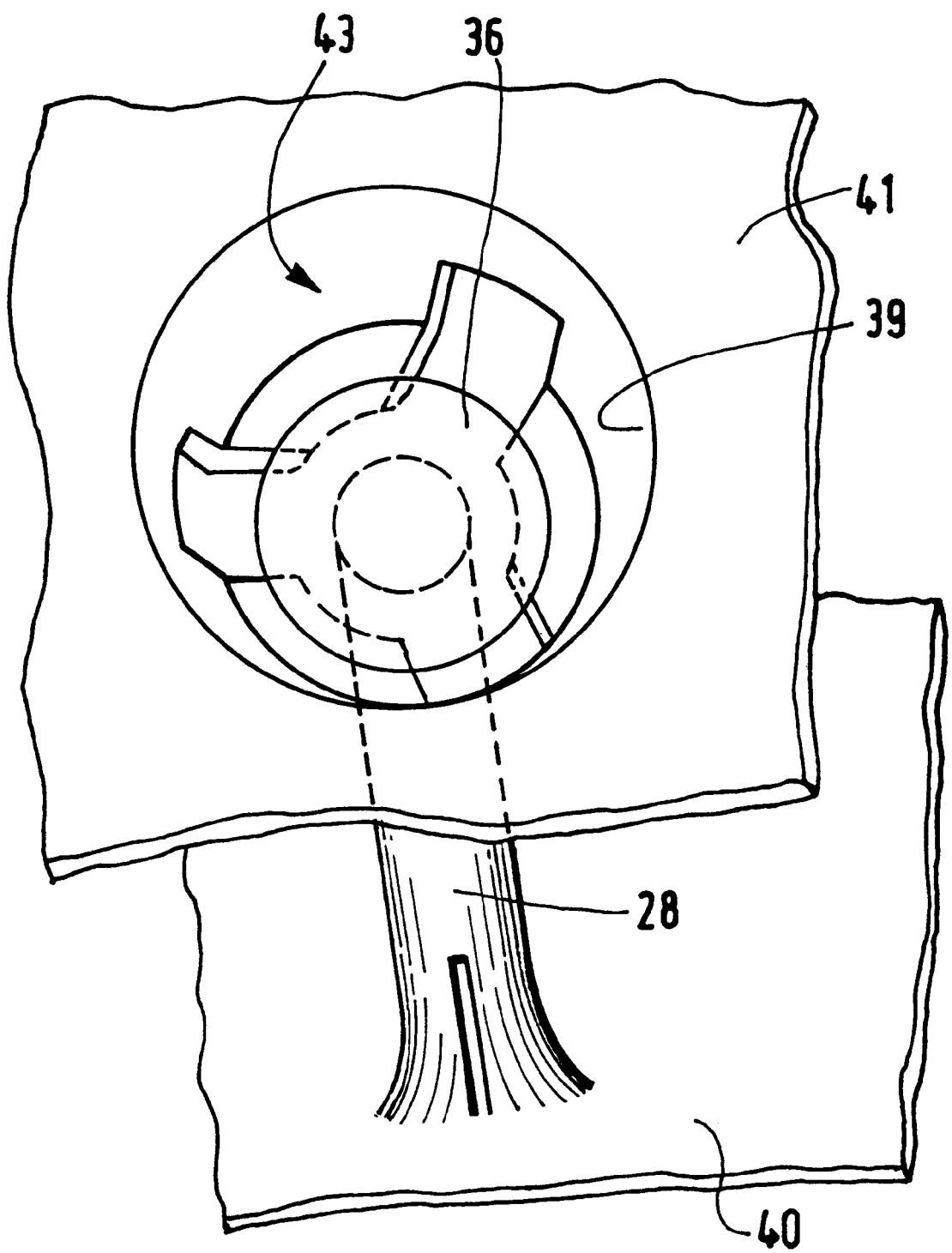
FIG. 7 is a perspective cut-away view of a similar device to the device of FIG. 4 installed in two joining parts to be locked together.

FIG. 7 represents another variant of the second embodiment of the invention where one sees the male part 28 and the female part 39 of the device connected to their respective joining parts 40 and 41 after being accommodated therein. It will be noted in this Figure that the second space 43 ends onto the outside of the first joining part 41. Furthermore, this second space has a flared shape becoming wider towards the exterior, while a draft of several degrees is necessary for molding the sleeve 39 in common with its support part 41. This flared shape may be used for taking the device apart by means of an appropriate tool. Such a tool of comparable form to that of the male part 28, but larger than the latter, works by going through the second space 43 so as to progressively remove the ends of the hooks of the female part 39 until the conical end 36 is released, the end of the male part 28 that the head of the tool can continue to push the sleeve outward for a complete disjointing.

The invention is not restricted to the embodiments described above. Notably for the second embodiment of FIG. 7, the male part 28 and the joining part 40 are generally made of plastic, of ABS and are obtained preferably by common molding. However, the male part 28 could be designed as a separate metal element and be firmly attached by its base by any known means to a plastic or metal joining part. The latter variant makes it possible, for example, to attach a hub-cap to a hub of a car wheel.

The invention makes it possible to diminish the number of screws for firmly attaching two joining parts and even to totally omit the use of screws for this purpose, moreover with respect to the second embodiment which makes it possible to have easy access from the outside for disjointing joining parts.

What is claimed is:

1. A joining device comprising:
   a female part having a retaining opening, said female part having female shoulders that form an input of said retaining opening; and
   a male part for joining with said female part, said male part having an inserting part with a tip end for insertion in said retaining opening; said inserting part having male shoulders which are opposite said tip end and are inclined with respect to said female shoulders so that a contact between said male shoulders and said female shoulders is reduced to a point when said inserting part is inserted in said retaining opening, said male shoulders being inclined in an inward and downward direction from an outer portion of said inserting part toward said tip end.

2. The joining device of claim 1, wherein said inserting part has a shape of an arc of a circle.

3. The joining device of claim 1, wherein said female part further includes hooks that form an insertion opening to initially receive said inserting part.

4. The joining device of claim 3, wherein said insertion opening has a flared shape.

5. The joining device of claim 1, wherein said male part is metal.

6. An apparatus having a joining device, said joining device comprising:
   a female part having a retaining opening, said female part having female shoulders that form an input of said retaining opening; and
   a male part for joining with said female part, said male part having an inserting part with a tip end for insertion in said retaining opening; said inserting part having male shoulders which are opposite said tip end and are inclined with respect to said female shoulders so that a contact between said male shoulders and said female shoulders is reduced to a point when said inserting part is inserted in said retaining opening, said male shoulders being inclined in an inward and downward direction from an outer portion of said inserting part toward said tip end.

7. The apparatus of claim 6, wherein said apparatus is a wireless telephone.

8. The apparatus of claim 6, wherein said apparatus is a remote control device.

9. The apparatus of claim 6, wherein said inserting part has a shape of an arc of a circle.

10. The apparatus of claim 6, wherein said female part further includes hooks that form an insertion opening to initially receive said inserting part.

11. The apparatus of claim 10, wherein said insertion opening has a flared shape.

12. The apparatus of claim 6, wherein said male part is metal.

* * * * *